United States Patent Office 3,836,683
Patented Sept. 17, 1974

3,836,683
METHOD OF PREPARING SHELF-STABLE PÂTÉS
Joseph W. Hoos, Waldwick, and Bohdan O. Hreschak, Hawthorne, N.J., assignors to Nabisco, Inc., New York, N.Y.
No Drawing. Filed May 10, 1971, Ser. No. 141,927
Int. Cl. A23c 23/00; A23l 1/00
U.S. Cl. 426—357                8 Claims

ABSTRACT OF THE DISCLOSURE

Method of making a shelf stable simulated meat pâté, spread or dip from dairy products by preparing a dry blend of dehydrated cultured milk product, with or without dehydrated soft cheese, and edible thickener and/or other ingredients, mixing edible vegetable oil and edible emulsifier and/or other ingredients with the dry blend, adding water and pasteurizing at a temperature of about 170° F. to about 185° F. by steam injection and adding edible antimycotic agent and edible flavoring agent at a temperature of about 170° F. to about 175° F. in the pasteurization.

---

This invention relates to a new food product and to a method of producing the same. More particularly, this invention relates to simulated meat and vegetable flavored pâtés or spreads produced from dairy products.

A large variety of food products including meat pâtés such as goose liver pâté and pâté de foie gras are on the market today and find use, for example, in the preparation of canapes, hors d'oeuvres and snacks in general. However, these products are conventionally packaged in tins or jars and once the package is opened, the shelf life of the product is severely limited. In addition, it is necessary to dispense the pâtés with a knife or other spreader. It is also known to package and dispense various food products from aerosol cans. However, heretofore, it has not been possible to package meat or meat products in such containers.

Food spreads of various types have been known. For example, U.S. Pats. 3,310,406, 3,397,994 and 3,397,995 disclose spreads simulating cheeses such as cheddar, bleu cheese, Swiss cheese, cream cheese and the like. Each of these products, however, require refrigeration and are not shelf-stable at room temperature. U.S. Pat. 3,397,997 discloses an oleaginous gel composition which incorporates an oil hardstock, e.g., hydrogenated fat and which is useful in the preparation of sandwich spreads containing excessively high levels of oil or excessively high levels of protein and very small, if any, amounts of water. None of the products disclosed in these patents comprise meat- or vegetable-flavored pâtés having a non-meat base and low to moderate amounts of fats and oils and which are shelf-stable at room temperature.

One object of this invention is to provide simulated pâtés and other products including meat- and vegetable-flavored edible spreads.

Another object of the invention resides in providing products which may be packaged in and dispensed from pressurized piston cans and/or aerosol cans.

A further object of this invention is to provide such products which are shelf-stable and require no refrigeration.

Still another object of this invention is to provide a process for the preparation of these products.

Still further objects and the applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In accordance with this invention, it has been surprising that a shelf-stable simulated pâté characterized by the popular and distinct flavor and consistency of pâtés may be prepared from a non-meat base requiring no refrigeration. It is also surprising that the pâté products may be prepared having flavors other than meat flavors, e.g., fish or seafood flavors and vegetable flavors.

In summary, this invention presents novel features both as a composition of matter and as a process. As a composition of matter, the invention comprises certain ingredients in specified proportions, as will be described below, which provide a simulated pâté or edible food spread having the characteristic pâté consistency and flavor and having a low to moderate fat and oil content. From a process point of view, this invention comprises certain steps of blending, mixing and heating which, when taken in the sequence and carried out in the manner as described, produce the novel products which are shelf-stable at ambient temperatures, requiring no refrigeration.

One feature of this invention resides in the finding that, by the use of a dairy base rather than a meat base, it is possible to provide a shelf-stable product requiring no refrigeration. Another feature of the invention resides in the finding that a substantial proportion of water, in amounts of between about 35 and about 60% of the total composition, may be incorporated into the product without adversely affecting the characteristic flavor, consistency or stability of pâtés of this invention. Additionally, the products of this invention are of a pleasing texture and are characterized by a taste which is extremely appealing to the consumer.

The spread composition in accordance with this instant invention comprises a dairy product base which provides texture and is present in amounts of from about 80% to about 99.8% by weight, preferably about 90% to 99%; ingredients to provide flavor and aroma in amounts of from about 0.2 to about 20% by weight, preferably about 1 to about 10%, and small amounts up to about 0.1% by weight of food dyes for color, these percentages being based on the ultimate weight of the spread composition. The dairy product base in accordance with the invention comprises the following ingredients and percentages by weight based on the ultimate weight of the spread composition:

| Ingredient: | Percentage |
| --- | --- |
| Dehydrated Cultured Milk Product | About 15 to about 40 |
| Dehydrated Soft Cheese | 0 to about 25 |
| Edible Vegetable Oil | About 1 to about 15 |
| Edible Thickener | About 1 to about 3 |
| Edible Antimycotic Agent | About 0.1 to about 0.15 |
| Edible Emulsifier | About 0.5 to about 1 |
| Sugar | 0 to about 4 |
| Salt | 0 to about 1 |
| Water | About 30 to about 60 |

The dehydrated cultured milk product preferably is dehydrated sour cream. Materials of this type can be prepared in the manner described in Noznick et al. U.S. Pat. 3,090,688, the disclosure of which is incorporated herein by reference, or can be prepared by spray drying sour cream prepared in the conventional manner. Also, as the dehydrated cultured milk product in the novel spread composition of this invention there can be used simulated or artificial sour cream powders such as are described in Tutter et al. U.S. Pat. 3,433,643 and Noznick et al. U.S. Pat. 3,443,960, the disclosures of both of which are incorporated herein by reference. Materials of this type are readily available commercially, and ordinarily contain minor amounts of anti-caking agents, such as, non-fat dry milk solids or starch; salt; antioxidants, such as butylated hydroxyanisole (BHA), butylated hydroxytoluene (BHT), and/or propyl gallate; and/or preservatives and buffers such as, citric acid, lactic acid and disodium phosphate.

The dehydrated soft cheese preferably is dehydrated cream cheese. Materials of this type can be prepared by drying a soft cheese such as cream cheese, cheddar cheese, Neufchatel cheese, cottage cheese, baker's cheese and the like using spray drying techniques, for example, as disclosed in Rogers U.S. Pat. 3,056,681, the disclosure of which is incorporated herein by reference. Other procedures can be used to prepare the dehydrated soft cheese, for example as disclosed in U.S. Pats. 2,576,597; 2,701,202; 2,789,909; 3,128,192 and 3,184,318, the disclosures of which are incorporated herein by reference. Products of this type are readily available commercially, and ordinarily contain minor amounts of anti-caking agents, such as, starch, antioxidants, such as, BHA, BHT, propyl gallate and monoglycerides; salt; and/or preservatives, such as citric acid, disodium phosphate and the like.

The preferred edibile vegetable oil is coconut oil although any other type of food grade vegetable oil, such as peanut oil, palm oil, soybean oil, cottonseed oil or any combination of the above oils, can be used. The preferred edible thickener is edible algin, food grade starch or a combination of edible algin and food grade starch. Suitable edible algins are commercially available and ordinarily contain a minor amount of dextrin as anti-caking agent. Suitable food grade starches are also commercially available. Other thickeners such as carboxymethyl cellulose, gelatin, alginates or sodium alginate can be used. The starch may be any edible vegetable starch including corn, wheat and rice or any combination of above.

The preferred antimycotic agent is sorbic acid, although any other type of food grade antimycotic agent can be used. Other antimycotic agents or mold inhibitors can be used such as sodium benzoate or sodium propionate in addition to or in place of sorbic acid.

The preferred food-grade emulsifiers are the monoglycerides from hydrogenated meat fats which are commercially available. Other food-grade emulsifiers can be used such as mono- and distearin, mono- and diolein, propylene glycol monostearate, sorbitol monopalmitate, sorbitan and polyoxyethylene sorbitan, mono- and di-stearates, lactostearins, lactobehenin, steary monoglyceridyl citrate and diacetyl tartaric acid ester of lauryl alcohol.

The edible flavoring agent also preferably provides the desired aroma and is present in the novel spread composition in amounts effective to provide the desired degree of flavor and aroma. Illustratively, the flavor and aroma ingredients are present in amounts of about 0.2 to about 20%, preferably about 1 to about 10%, based on the ultimate weight of the spread composition. The edible flavor and aroma ingredients, i.e., the edible flavoring agents, include such products as imitation meat bases and gravy mixes, imitation meat flavorings, meat fats, conventional meat seasonings and hickory smoke flavoring. Other flavorings including concentrated or dehydrated vegetable, fish or seafood flavorings may also be used. Such products are commercially available in a wide variety from many sources. Color is imparted to the product through the use of one or more conventional food dyes.

The preferred dairy product base employed in the spread compositions of this invention comprises the following ingredients and percentages based on the ultimate weight of the spread composition:

| Ingredient | Percentage |
|---|---|
| Dehydrate Sour Cream | About 19 to about 37 |
| Dehydrated Cream Cheese | About 17 to about 21 |
| Edible Coconut Oil | About 2 to about 13 |
| Edible Algin | About 1 to about 2 |
| Edible Starch | About 0.4 to about 0.9 |
| Sorbic Acid | About 0.1 to about 0.15 |
| Edible Emulsifier | About 0.6 to about 0.9 |
| Salt | About 0.1 to about 0.9 |
| Water | About 35 to about 46 |

The novel method according to the present invention is preferably carried out as follows:

(a) A dry blend is prepared of the dehydrated cultured milk product, the dehydrated soft cheese, if used, the edible thickener, sugar, if used, and salt, if used.

(b) Liquid or liquefied edible vegetable oil and the edible emulsifier are added to the dry blend and mixed until thoroughly blended.

(c) Between about 70% and about 85%, preferably about 80%, of the specified amount of water is added and thoroughly mixed into the resulting mixture (the balance of the specified amount being added by steam injection).

(d) Steam is injected with continued mixing until the temperature of the product is increased between 170° F. and 175° F.

(e) Edible flavoring agent and edible antimycotic agent are added at a temperature between 170° F. and 175° F.

(f) Steam injection is continued to complete the pasteurization cycle and until the product reaches a maximum temperature of about 185° F. to about 188° F. The total time of steam injection takes about 5 to about 15 mins., preferably about 7 to 9 mins. The product is then filled into containers such as aerosol cans which preferably are pre-sterilized and then the containers are sealed.

The dry blending step may be conducted in any suitable mixing apparatus such as a screw conveyor and the blend is then introduced into a heated mixing apparatus such as a jacketed kettle mixer. The edible vegetable oil and edible emulsifier may be added to the dry blend in either of the above types of mixing apparatus. The heated mixer is provided with metered inlets for water and steam and with an opening for introduction of the flavorings and sorbic acid. The mixer may also be provided with a pump to facilitate filling of the product into containers. Preferably the product is filled into the containers while hot, e.g., at a minimum temperature of about 175° F., preferably about 175° F. to about 180° F.

The water used may be preheated to a temperature, e.g., between about 150° F. and 170° F. and the steam is preferably added by direct steam injection at pressures preferably ranging from about 60 to about 70 p.s.i. with no boiler water carry-over.

For the sake of clarity, the following examples are described in detail hereinbelow. It will be understood, however, that the examples are purely illustrative, and that the invention is not to be considered as limited to the particular ingredients and operating data given therein, the intention being to cover all of the modifications and equivalents of the process within the scope of the appended claims.

EXAMPLES 1–3

Beef flavored pâté

Beef flavored simulated pâté and Braunschweiger spread were prepared from the following ingredients:

TABLE I

| Example | Amount (percent by weight) | | |
|---|---|---|---|
| | 1 | 2 | 3 |
| Ingredients: | | | |
| Dehydrated sour cream | 22.1 | 19.4 | 20.2 |
| Dehydrated cream cheese | 20.8 | 18.25 | 19.0 |
| Algin | 1.7 | 1.53 | 1.6 |
| Sorbic acid | 0.13 | 0.12 | 0.12 |
| Salt | 0.54 | 0.59 | 0.86 |
| Coconut oil | 12.1 | 10.6 | 11.00 |
| Emulsifier | 0.85 | 0.74 | 0.77 |
| Sugar | | 1.8 | 1.8 |
| Starch | | | 0.74 |
| Imitation beef flavor | 4.07 | 3.46 | |
| Smoke flavor | | | 0.12 |
| Braunschweiger seasoning | | | .37 |
| Brown shade | | 0.06 | 0.0055 |
| Red shade | 0.13 | | 0.0025 |
| Black shade | | | 3.0025 |
| Water | 37.6 | 43.6 | 42.6 |

The dehydrated sour cream, dehydrated cream cheese align, salt and all other dry ingredients except sorbic acid, flavorings and seasonings were dry blended in a screw conveyor and charged into a Lee kettle where the coconut oil and emulsifier were added to the mixture. About 80% of the total amount of water was added and mixed into the mass, after which steam was directly injected at a pressure of 70 p.s.i. Injection of the steam was continued with further mixing of the mass until the temperature reached 170° F. at which time the flavorings, seasonings and food coloring were added.

The steam injection and mixing were continued until the temperature of the mass reached 185° F. The entire time of steam injection was about 9 minutes and provided the remaining 20% of the total amount of water. The pasteurized product was pumped from the kettle to a filler and filled into presterilized pressure piston cans. The valve and nozzle assemblies of the cans were crimped and the cans were energized with 100 p.s.i. of nitrogen.

The resulting pressurized cans of pâtés and spreads were capable of being stored for prolonged periods without refrigeration, e.g., in a storeroom on the grocer's shelf or in the housewife's cupboard without deterioration in the appearance, texture, flavor or wholesomeness of the product. Each product possessed a delightful meat flavor of beef pâté or Braunschweiger spread as the case may be. Each product had a rich smooth spread like texture and an appetizing taste and aroma. The pâtés and spread were readily dispensed from the cans in various designs such as swirls, rosettes etc. onto crackers, bread, chips and other such baked foods to provide an attractive and appealing snack.

EXAMPLES 4-7

A ham pâté, a California spread, a chicken pâté and a continental spread were prepared from the following ingredients:

TABLE II

| Example | Amount (percent by weight) | | | |
|---|---|---|---|---|
| | 4 | 5 | 6 | 7 |
| Ingredients: | | | | |
| Dehydrated sour cream | 20.2 | 26.2 | 19.1 | 20.5 |
| Dehydrated cream cheese | 19.0 | | 17.9 | 20.5 |
| Algin | 1.6 | 1.4 | 1.5 | 1.44 |
| Sorbic acid | 0.12 | 0.11 | 0.11 | 0.11 |
| Coconut oil | 11.00 | 9.6 | 5.2 | 5.50 |
| Emulsifier | 0.77 | 0.68 | 0.73 | 0.78 |
| Sugar | 1.8 | | 3.5 | 6.00 |
| Starch | 0.49 | 0.43 | 0.69 | 0.89 |
| Dehydrated sour cream | | 12.3 | | |
| Imitation chicken flavor | | | 3.07 | |
| Imitation ham flavor | 3.3 | | | |
| Smoke flavor | 0.12 | | | |
| Onion flavor | | | 3.2 | |
| Rendered chicken fat | | | 5.2 | |
| Salt | 0.31 | 0.11 | | 0.82 |
| Tomato paste | | | | 1.89 |
| Natural spices | | | | 0.80 |
| Distilled vinegar | | | | 1.26 |
| Beet powder | | 0.18 | | |
| Red shade | 0.00061 | | | |
| Titanium dioxide | | | 0.11 | 0.55 |
| Parsley flakes | | | 0.05 | |
| Water | 40.9 | 45.7 | 43.0 | 38.96 |

The ingredients were mixed, processed and filled into cans in the manner described above in Examples 1 through 3. The resulting pressurized cans of pâté and spreads were capable of being stored for prolonged periods of time without refrigeration, e.g., in a warehouse, on the grocer's shelf or in the housewife's cupboard without deterioration of quality, wholesomeness, appearance, texture or taste. Each pâté possessed a delighful meat flavor of ham pâté or chicken pâté as the case may be. Each pâté and spread had a rich creamy texture and an appetizing flavor and aroma. The products were easily dispensed from the pressurized cans in a variety or designs, e.g., swirls, rosettes, etc. onto crackers, chips, bread and other fried or baked goods to provide an appealing and attractive snack.

Dehydrated sour cream used in the examples is a dehydrated mixture containing about 80 wt. percent cultured sour cream, and the remainder of non-fat milk solids and an antioxidant. Dehydrated cream cheese used in Examples 1 through 4, 6 and 7 has an ingredient statement of dehydrated cottage cheese, vegetable oil, cream, starch, salt, disodium phosphate, citric acid, and an antioxidant system of monoglycerides, BHT, BHA and propyl gallate; has a typical analysis on a weight basis of 2.1% moisture, 42.0% fat, 27.0% protein, 20.0% carbohydrate, 9.0% ash and 6.5% chloride (NaCl); and has a pH of 5.8. Dehydrated sour cream used in Example 5 has an ingredient statement of sour cream, non-fat dry milk solids, starch, salt, disodium phosphate, citric acid, lactic acid, BHA and propyl gallate; has an average analysis on a weight basis of 3% moisture, 53% fat, 12% protein, 28% carbohydrate, 4% ash and 1.5% chloride (NaCl); and has an average pH of 5. It is preferred that, when dehydrated cultured milk product and dehydrated soft cheese are used together in the spread compositions of this invention, the combined amounts thereof constitute about 30 to 45% of the ultimate weight of the spread. Other edible substances and ingredients can be included in the novel edible spreads of this invention for purposes of adding special effects.

What is claimed is:

1. Method of preparing an edible spread resembling pâté characterized by a smooth, rich texture and shelf-stable at ambient temperature comprising the steps of:
   A. preparing a dry blend comprising, based on the ultimate weight of said spread,
      (1) about 15 to about 40% dehydrated cultured milk product; and
      (2) about 1 to about 3% edible thickener;
   B. mixing with said dry blend, based on the ultimate weight of said spread,
      (1) about 1 to about 15% edible vegetable oil; and
      (2) about 0.5 to about 1% edible emulsifier;
   C. adding water and pasteurizing the resulting mixture by steam injection to a temperature in the range of about 170° F. to about 185° F. to provide a water content of about 30 to about 60% based on the ultimate weight of said spread;
   D. adding to said mixture at a temperature of about 170° F. to about 175° F.
      (1) about 0.1 to about 0.15% edible antimycotic agent, based on the ultimate weight of said spread; and
      (2) an effective amount of an edible flavoring agent.

2. Method as claimed in claim 1 wherein said dry blend also comprises up to about 25% dehydrated soft cheese, up to about 4% sugar, and up to about 1% salt, based on the ultimate weight of said spread.

3. Method as claimed in claim 1 wherein said dry blend also contains about 15 to about 25% dehydrated soft cheese.

4. Method as claimed in claim 1 wherein said edible vegetable oil is coconut oil.

5. Method as claimed in claim 1 wherein said edible thickener is algin in an amount of about 1 to about 2% and starch in an amount up to about 1%.

6. Method as claimed in claim 1 wherein said edible antimycotic agent is sorbic acid.

7. Method as claimed in claim 1 wherein said edible emulsifier is a mixture of monoglycerides derived from hydrogenated meat fats.

8. Method as claimed in claim 3 wherein said dehydrated soft cheese is dehydrated cream cheese.

(References on following page)

References Cited

UNITED STATES PATENTS

| | | | |
|---|---|---|---|
| 3,397,994 | 8/1968 | Elenbogen | 99—144 |
| 2,617,730 | 11/1952 | Long et al. | 99—117 |
| 2,688,553 | 9/1954 | Schicks et al. | 99—117 |

A. LOUIS MONACELL, Primary Examiner

J. M. HUNTER, Assistant Examiner

U.S. Cl. X.R.

426—356, 359, 522, 189, 151